United States Patent [19]

Siwersson, deceased et al.

[11] Patent Number: 5,083,658
[45] Date of Patent: Jan. 28, 1992

[54] BELT CONVEYOR

[75] Inventors: Olle Siwersson, deceased, late of Helsingborg, Sweden, by Vanja Siwersson, Stefan Siwersson and Joacim Siwersson, legal representatives; Torsten Loodberg, Nyhamnsläge; Kent Kristensson, Helsingborg, both of Sweden

[73] Assignee: Scaniainventor Conveyor Sicon AB, Helsingborg, Sweden

[21] Appl. No.: 659,390

[22] PCT Filed: Jun. 20, 1989

[86] PCT No.: PCT/SE89/00354
§ 371 Date: Feb. 21, 1991
§ 102(e) Date: Feb. 21, 1991

[87] PCT Pub. No.: WO89/12593
PCT Pub. Date: Dec. 28, 1989

[30] Foreign Application Priority Data

Jun. 23, 1988 [SE] Sweden ................................ 8802367

[51] Int. Cl.$^5$ ............................................. B65G 15/10
[52] U.S. Cl. .................................................... 198/819
[58] Field of Search ......................................... 198/819

[56] References Cited

U.S. PATENT DOCUMENTS 3,164,238 1/1965 McCullagh .

FOREIGN PATENT DOCUMENTS 3447248 7/1985 Fed. Rep. of Germany .
PCT/SEC86-
/00552 6/1987 PCT Int'l Appl. .
8004322-7 7/1983 Sweden .

Primary Examiner—Joseph E. Valenza
Attorney, Agent, or Firm—Browdy and Neimark

[57] ABSTRACT

A belt conveyor comprises an endless belt (1) with two force-absorbing members (2, 3) extending throughout the entire length of the belt. These members are each connected to a respective edge portion of the belt and project from the same side of the belt when this is the straightened state. Support rollers are disposed for supporting the belt along at least a part of the conveying path. Each force-absorbing member (2, 3) is connected to it belts edge portion via a hinge portion enabling said member to turn through about ±90° relative to said belt edge portion for guiding the belt about a deflecting roller (13) whose axis (14) is substantially perpendicular to the plane of the adjacent conveyor belt part, the two force-absorbing members being turned in the same direction relative to the respective belt edge portion and located at substantially the same distance from the axis of the deflecting roller.

8 Claims, 3 Drawing Sheets

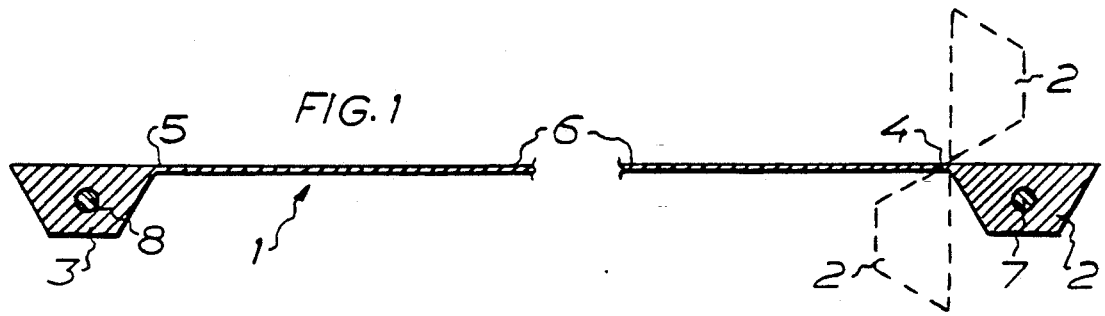
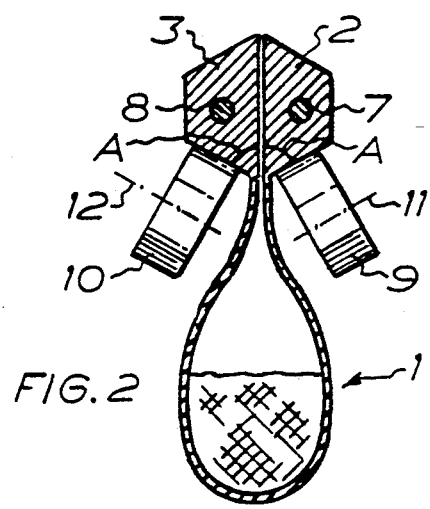
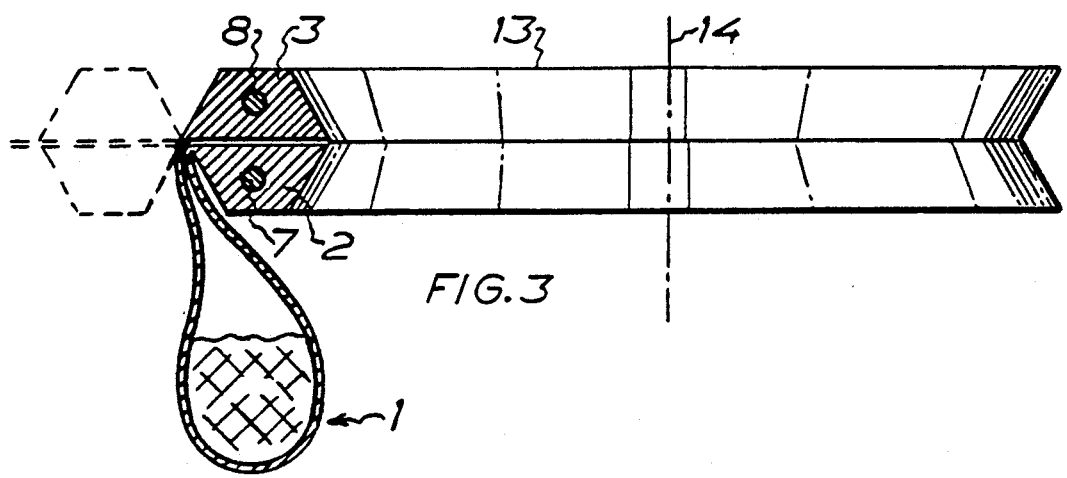

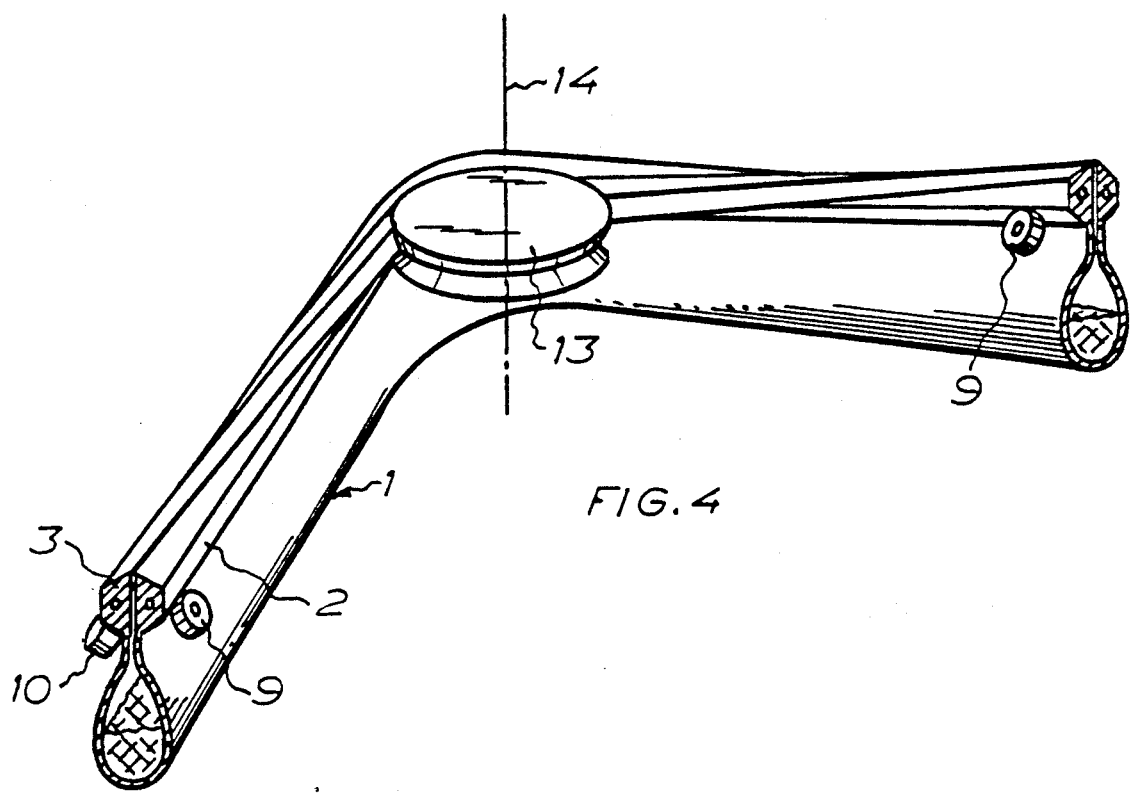
FIG.4
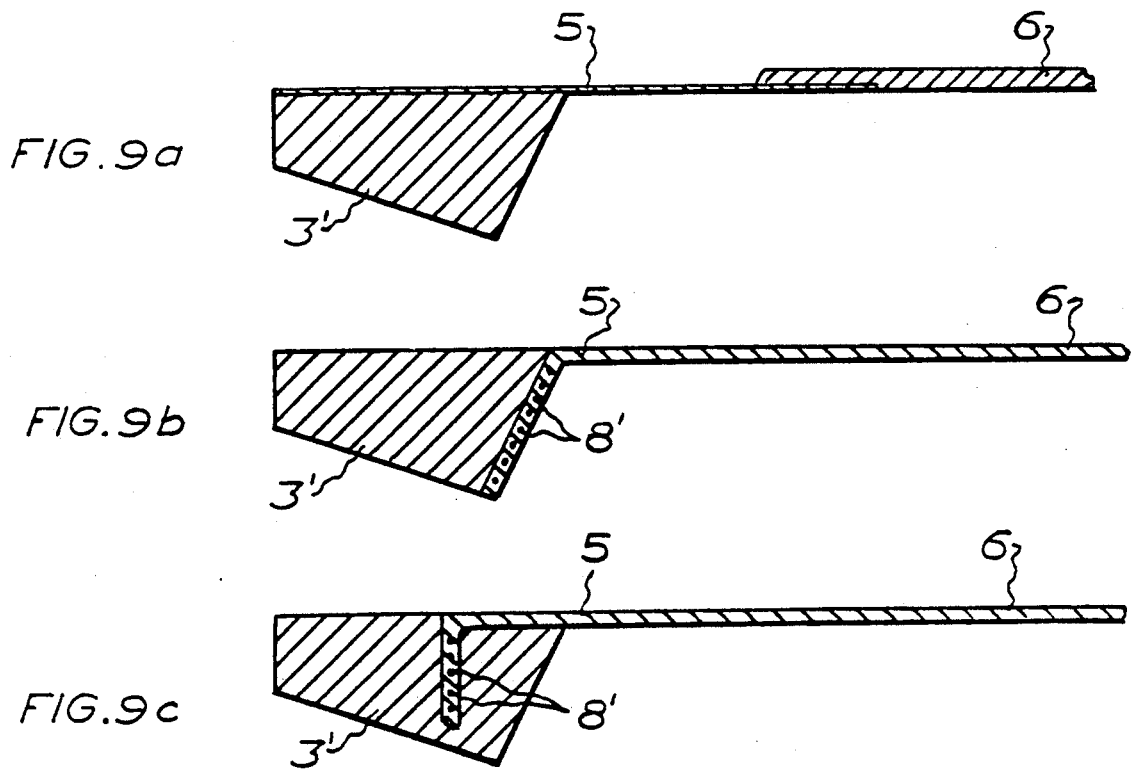
FIG.9a
FIG.9b
FIG.9c

BELT CONVEYOR

The present invention relates to a belt conveyor comprising an endless belt with two force-absorbing members extending throughout the entire length of the belt and being each connected to a respective edge portion of the belt and projecting from the same side of the belt when this is in the straightened state, and support rollers for supporting the belt along at least a part of the conveying path.

Belt conveyors of this type are previously known from, for example, U.S. Pat. No. 3,164,238 and SE-C-7809688-0. They are advantageous in that they afford a closed conveyance of goods, require but little space, and can be opened for turning about and emptying over a deflecting roller.

Along the goods conveyance path, the belt is carried via the two force-absorbing members which have but low extensibility in the longitudinal direction. As a result, difficulties arise in horizontal curves along the belt path where the belt is closed, in that the force-absorbing members are conducted immediately adjacent one another. If the force-absorbing members are conducted in side-by-side relation through a horizontal curve, they will be forced to follow paths of different lengths, which is undesirable. If, instead the two force-absorbing members are conducted above one another through a horizontal curve, they will, it is true, have the same length of travel, but adjacent belt parts will be subjected to heavy wear, bending or elongation, whereby these parts are rapidly worn out.

It therefore is the object of the present invention to provide a belt conveyor which is of the type referred to in the introduction and which can be conducted through sharp horizontal curves without causing the force-absorbing elements to follow paths of different lengths, and without causing fatigue of the belt parts adjacent these members.

This and further objects of the invention are achieved in that the belt conveyor is characterised in that each force-absorbing member is connected to its belt edge portion via a narrow hinge portion enabling said member to turn through about ±90° relative to said belt edge portion for guiding the belt about a deflecting roller whose axis is substantially perpendicular to the plane of the adjacent conveyor belt part, the two force-absorbing members being turned in the same direction relative to the respective belt edge portion and located at substantially the same distance from the axis of the deflecting roller. In this manner, also the bag-shaped part of the belt between the force-absorbing members will then with its centre follow a path which is spaced from the axis of the deflecting roller by the same distance as the force-absorbing members, whereby elongation of the belt is substantially avoided so that the belt can be conducted about a deflecting roller at a very small radius at an optional angle of wrap of up to 180°. Because of the hinge portions according to the invention, substantially the entire belt, including the force-absorbing members, can move at one and the same radial distance about the deflecting roller.

The deflecting roller preferably is a V-belt pulley. It may have a single V-belt groove, in which case the two force-absorbing members together form a V-belt fitting into one V-belt groove, or two adjacent V-belt grooves, in which case each force-absorbing member forms a V-belt fitting into the respective groove.

To obtain clearance between the support rollers and the belt portions adjacent the force-absorbing members, these members are suitably polygonal in cross-section, with an acute angle between the two sides of the polygon that connect to the hinge portion.

Furthermore, in a preferred embodiment, each force-absorbing member has a V-belt shape where the broad side of the V-belt is an extension of the belt in its straightened state.

To prevent any substantial elongation of the force-absorbing members in the longitudinal direction, they are preferably reinforced. The reinforcement may be a rope, such as a wire, which is circular in cross-section. Alternatively, the reinforcement may be substantially planar in cross-section and disposed in a plane substantially perpendicular to the belt in the straightened state thereof.

The invention will be described in more detail hereinafter, reference being had to the accompanying drawings.

FIG. 1 is a cross-sectional view of an endless conveyor belt that can be used with the belt conveyor according to the invention.

FIG. 2 is a cross-sectional view of the belt in FIG. 1 and shows the belt in its closed state supported by support rollers.

FIG. 3 is a cross-sectional view of the belt in FIG. 1 and shows how the belt according to the invention is conducted in a horizontal curve over a deflecting roller.

FIG. 4 is a schematic perspective view showing the deflecting roller according to FIG. 3 and adjacent parts of the belt conveyor according to the invention.

Figure 5:
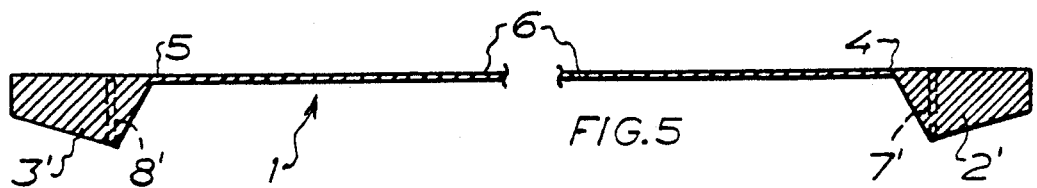
Figure 6:
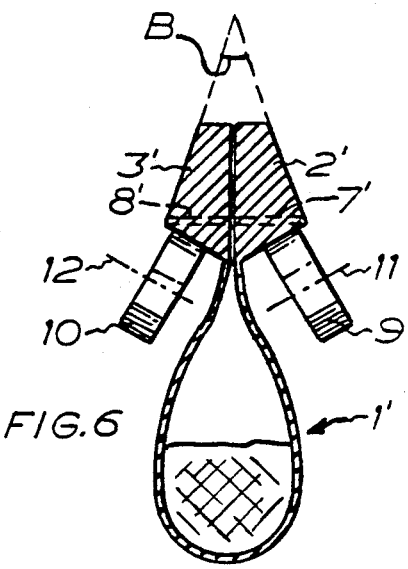
Figure 7:
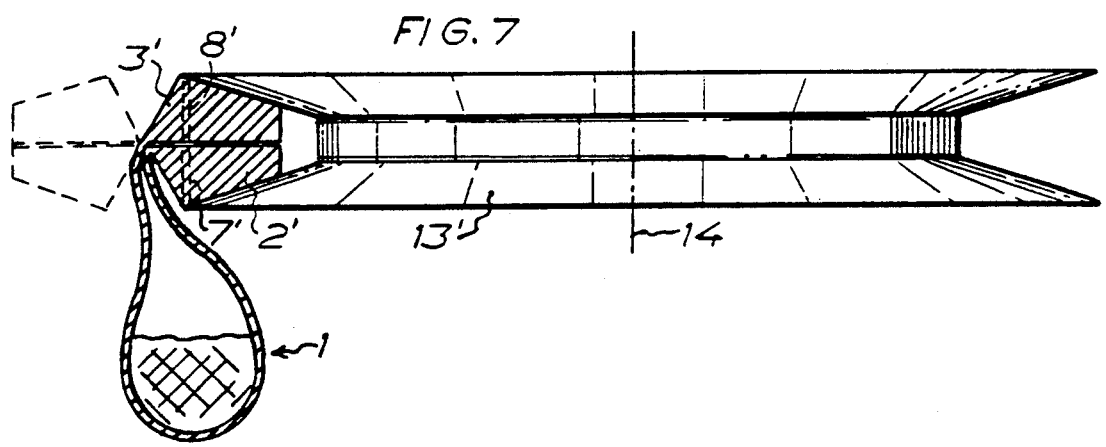

FIGS. 5-7 correspond to FIGS. 1-3, but show a more preferred embodiment of the belt and the deflecting roller.

Figure 8:
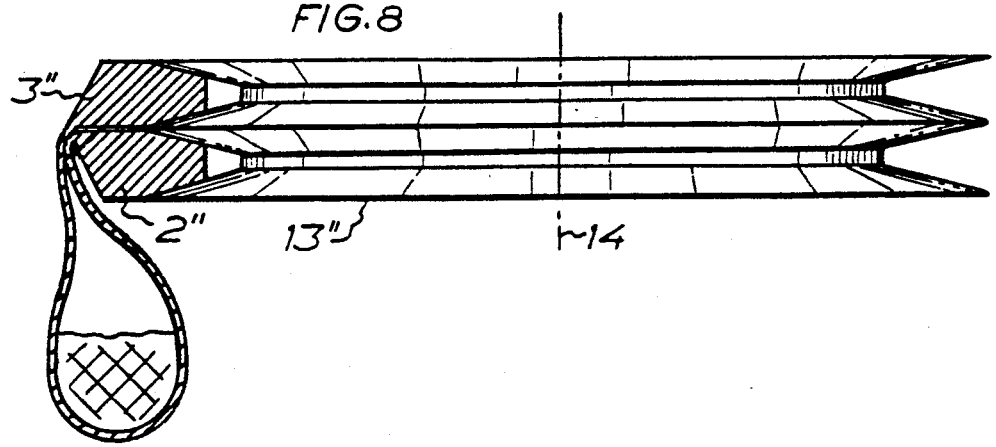

FIG. 8 corresponds to FIG. 7, but shows still another variant of the belt and the deflecting roller.

FIG. 9a-9c illustrates on a larger scale three different embodiments of the hinge portion according to the invention.

For better clarity, the dimensions of the force-absorbing members shown in FIGS. 2-4 and 6-8 are exaggerated relative to the other belt dimensions, especially the belt width.

A belt conveyor 1 as shown in FIGS. 1-4 consists mainly of a flexible and extensible material, such as rubber. Each edge portion of the belt is connected to a force-absorbing member 2, 3 extending throughout the entire length of the belt and capable of absorbing both tensile forces and load forces. According to the invention, the members 2, 3 are connected to the respective belt edge portion via a narrow hinge portion 4, 5 enabling the member 2, 3 to be turned through approximately ±90° relative to the belt edge portion, as shown by dash lines to the right in FIG. 1.

The intermediate portion 6 of the belt 1, between the hinge portions 4, 5, may preferably have a fabric insert with the fibres of the fabric being directed for example ±45° relative to the longitudinal direction of the belt 1. The fabric insert does not absorb tensile forces, but merely serves to distribute the load forces. The force-absorbing members 2, 3 are also reinforced, for example with a rope 7, 8 in the form of a steel wire.

The belt 1 may be in the state shown in FIG. 1 during its movement about, for example, a turning roller in the form of a turning drum with peripheral grooves for receiving the force-absorbing members 2, 3. Along the straight reaches of the goods conveyance path, on the other hand, the belt is preferably closed in the manner shown in FIG. 2. Here, the belt 1 is supported via the force-absorbing members 2, 3 by two support rollers 9, 10 which in turn are rotatably mounted in a frame (not shown) about axes of rotation 11, 12 shown by dash lines.

To obtain clearance between the support rollers 9, 10 and the band portions adjacent the force-absorbing members 2, 3, the angles A shown in FIG. 2 are acute angles. Generally, the force-absorbing members 2, 3 may be polygonal in cross-section and then have an acute angle between the two sides of the polygon which connect to the respective hinge portion 4, 5.

Owing to the hinge portions 4, 5 which are distinct hinge points, i.e. they have a limited extent perpendicular to the longitudinal direction of the belt 1, the belt 1, as shown in FIG. 3, can be conducted in closed shape through a horizontal curve about a deflecting roller 13 having a vertical axis of rotation 14. In this case, the deflecting roller 13 has a V-shaped groove profile for engagement with the force-absorbing members 2, 3 which are turned through 90° in the same direction relative to the respective belt edge portion and, furthermore, assume essentially the same mutual position as in FIG. 2. In other words, the members 2, 3 are turned substantially in relation to a centre line through the bag-shaped part of the belt 1. As will appear from FIG. 3, the force-absorbing members are at substantially the same distance from the axis of rotation of the deflecting roller 13, and this applies also to the reinforcing ropes 7, 8 of the members 2, 3, and to the intermediate portion of the belt 1 which lies between the hinge portions 4, 5 and therefore is not subjected to any substantial elongation. As has been indicated by dash lines in FIG. 3, the belt 1 may also be conducted through a horizontal curve in the opposite direction, in that the force-absorbing members 2, 3 are turned substantially through 90° from the position shown in FIG. 2 into the opposite direction relative to the position shown by full lines in FIG. 3. The 90° turn provides for complete symmetry regarding the members 2, 3 relative to the deflecting roller 13 and the axis of rotation 14 thereof.

The transition from the support rollers 9, 10 to the deflecting roller 13 is shown schematically in FIG. 4. Additional rollers (not shown) may be required for guiding the force-absorbing members 2, 3 into engagement with the deflecting roller 13, or vice versa.

Although the deflecting roller 13 in the above description is said to have a vertical axis of rotation to facilitate conducting the belt through a horizontal curve, its axis of rotation 14 may, of course, also have a different spatial orientation as long as the axis 14 is substantially perpendicular to the plane of the adjacent conveyor belt part, as shown in FIG. 4.

FIGS. 5-7 illustrate another preferred embodiment of a conveyor belt 1' and a deflecting roller 13' according to the invention. The belt 1' is identical with the one shown in FIGS. 1-4, excepting the cross-sectional shape of its force-absorbing members 2', 3'. In FIGS. 5-7, the force-absorbing members 2', 3' also have a different reinforcement 7', 8' than the members 2, 3 in FIGS. 1-4, but this difference is immaterial to the function of the embodiment according to FIGS. 5-7. In their position immediately adjacent one another (as shown in FIGS. 6 and 7), in which they support the belt 1', the force-absorbing members 2', 3' together form a V-rope having a top angle B. To be able to receive the V-rope formed by the members 2', 3', the deflecting roller 13' is formed as a V-belt pulley, the groove angle of which makes the angle B. Furthermore, the groove has, in conventional manner, a depth such that the members 2', 3' do not come in contact with the bottom of the groove.

It goes without saying that the V-shape of the members 2', 3' greatly improves the running characteristics of the conveyor belt 1'.

The reinforcement 7', 8' of the members 2', 3' is a planar reinforcement. More particularely, the plane of the reinforcement is substantially perpendicular to the plane of the belt 1' in the straightened state of the belt. This orientation of the reinforcement is advantageous both along substantially straight reaches of the conveying path where the belt is carried in the manner shown in FIG. 6, because the reinforcement 7', 8' is here equally loaded in every part, and about the V-belt pulley 13' because here all parts of the reinforcement 7', 8' are at the same distance from the axis of rotation 14.

As a further variant, each force-absorbing member may be in the form of a V-rope 2", 3" as shown in FIG. 8 where the deflecting roller 13" having the axis of rotation 14 is formed with double grooves each receiving one of the members 2", 3".

FIG. 9 illustrates three different hinge connections between the intermediate portion 6 of the conveyor belt 1 and, for example, the force-absorbing member 3' via the hinge portion 5. In FIG. 9a, the hinge portion 5 is a separate member fixedly connected, for example by vulcanisation, with both the member 3' and the side edge of the intermediate portion 6 of the belt 1. In this manner, each member 3', 5 and 6 can be conveniently given the desired characteristics.

However, the hinge portion 5 may be formed as an integrated part of the belt 1, for example by making it in one piece with and at the same time as the intermediate portion 6, as shown in FIG. 9b and c. In this instance, the hinge portion 5 can be given its flexibility by making it from some pliable material, by reducing its thickness and/or by omitting the reinforcement, although this is not especially shown in FIGS. 9b and c. In the embodiment according to FIG. 9b, the member 3' is manufactured separately, and the members 8', 5 and 6 in one piece. Finally, the member 3' is joined to the member 8'.

The variant shown in FIG. 9c mainly corresponds to the one shown in FIG. 9b, excepting the location of the reinforcement 8'.

In all instances, the hinge portion 5, besides its flexibility, preferably also has a substantial extensibility in the longitudinal and/or transverse direction. Of the utmost importance is that the hinge portion 5 is a distinct hinge point about which the belt will flex naturally. In other words, the hinge portion must have an essentially higher flexibility than the remaining parts of the belt 1.

It will be appreciated that a variety of modifications of the belt conveyor embodiments described above are obviously possible within the scope of the invention. For example, it is possible to change the material chosen for the conveyor belt, the design of the force-absorbing members, and the shape and location of the reinforcement. It may also be necessary to complete the embodiments schematically illustrated with further guide rollers or pressure rollers to make the conveyor belt and the force-absorbing members follow the desired path. According to a further modification, the support rollers 9, 10 and/or the guide rollers may be cambered, and the force-absorbing members may also be axially spaced apart about the deflecting roller.

It is claimed:

1. A belt conveyor comprising an endless belt (1; 1') with two force-absorbing members (2, 3; 2'; 3') extending throughout the entire length of the belt and being each connected to a respective edge portion of the belt and projecting from the same side of the belt when this is in the straightened state, and support rollers (9, 10) for supporting the belt along at least a part of the conveying path, characterised in that each force-absorbing member (2, 3; 2'; 3') is connected to its belt edge portion via a narrow hinge portion (4, 5) enabling said member to turn through about ±90° relative to said belt edge portion for guiding the belt about a deflecting roller (13; 13', 13'') whose axis (14) is substantially perpendicular to the plane of the adjacent conveyor belt part, the two force-absorbing members being turned in the same direction relative to the respective belt edge portion and located at substantially the same distance from the axis of the deflecting roller.

2. A belt conveyor as claimed in claim 1, characterised in that the deflecting roller (13') is a V-belt pulley, and that the two force-absorbing members (2', 3') together form a V-belt fitting into the V-belt pulley.

3. A belt conveyor as claimed in claim 1, characterised in that the deflecting roller (13'') is a V-belt pulley with two adjacent V-belt grooves, and that each force-absorbing member (2'', 3'') forms a V-belt fitting into the respective groove.

4. A belt conveyor as claimed in claim 1, characterised in that each force-absorbing member (2, 3; 2', 3'; 2'', 3'') is polygonal in cross-section, with an acute angle between the two sides of the polygon that connect to the hinge portion (4, 5).

5. A conveyor belt as claimed in claim 1, characterised in that each force-absorbing member (2, 3) has a V-belt shape where the broad side of the V-belt is an extension of the belt (1) in its straightened state.

6. A belt conveyor as claimed in claim 1, characterised in that each force-absorbing member (2, 3; 2'; 3') is reinforced.

7. A belt conveyor as claimed in claim 6, characterised in that the reinforcement (7', 8') is disposed in a plane substantially perpendicular to the belt (1') in the straightened state thereof.

8. A belt conveyor as claimed in claim 1, characterised in that the support rollers (9, 10) and/or any additional guide rollers are cambered.

* * * * *